United States Patent [19]

Alexandratos et al.

[11] Patent Number: 4,879,316
[45] Date of Patent: Nov. 7, 1989

[54] INTERPENETRATING POLYMER NETWORK ION EXCHANGE MEMBRANES AND METHOD FOR PREPARING SAME

[75] Inventors: Spiro D. Alexandratos, Knoxville, Tenn.; Pier R. Danesi, Vienna, Austria; E. Philip Horwitz, Naperville, Ill.

[73] Assignee: The University of Tennessee Research Corporation, Knoxville, Tenn.

[21] Appl. No.: 19,441

[22] Filed: Feb. 26, 1987

[51] Int. Cl.⁴ ............................................. C08D 5/20
[52] U.S. Cl. .................................... 521/27; 521/28
[58] Field of Search ........................................ 521/27

[56] References Cited

U.S. PATENT DOCUMENTS

| | | | |
|---|---|---|---|
| 3,041,292 | 6/1962 | Hatch | 260/2.1 |
| 3,205,184 | 9/1965 | Hatch | 260/2.1 |
| 3,332,890 | 7/1967 | Hatch | 260/2.1 |
| 3,645,922 | 2/1972 | Weiss et al. | 260/2.1 |
| 3,803,059 | 4/1974 | Kessick | 260/2.1 |
| 3,875,085 | 4/1975 | Bolto | 260/2.1 |
| 3,876,565 | 4/1975 | Takashima et al. | 260/2.1 |
| 3,957,698 | 5/1976 | Hatch | 260/2.1 |
| 3,991,017 | 11/1976 | Barrett et al. | 260/2.1 |
| 4,045,574 | 9/1983 | Lee et al. | 423/157 |
| 4,119,581 | 10/1978 | Rembaum et al. | 521/27 |
| 4,150,205 | 4/1979 | Wheaton | 521/28 |
| 4,235,972 | 11/1980 | Jones | 521/28 |
| 4,260,740 | 4/1981 | Carrington | 536/63 |
| 4,277,565 | 7/1981 | Oda et al. | 521/31 |
| 4,410,638 | 10/1983 | Bachot et al. | 521/27 |
| 4,423,099 | 12/1983 | Mueller | 428/35 |
| 4,423,158 | 12/1983 | Porath | 521/32 |
| 4,434,138 | 2/1984 | Lee et al. | 423/7 |
| 4,488,949 | 12/1984 | Lee et al. | 521/28 |
| 4,522,951 | 6/1985 | Lee | 521/28 |
| 4,608,393 | 8/1986 | Hamano | 521/27 |
| 4,622,344 | 11/1986 | Babcock | 521/28 |
| 4,629,741 | 12/1986 | Beale, Jr. | 521/28 |
| 4,711,907 | 12/1987 | Sterzel et al. | 521/27 |

OTHER PUBLICATIONS

"Separation of Metal Species by Supported Liquid Membranes", Author: Pier R. Danesi—Publication: Separation Science and Technology 19 (11 & 12), pp. 857-894, 1984-85.

"Synthesis of Interpenetrating Polymer Networks as Metal Ion Complexing Agents", Author: Spiro D. Alexandratos and Marc A. Strand, Publication: Macromolecules, 19, pp. 273-280 (published Feb. 26, 1986).

Primary Examiner—Joseph L. Schofer
Assistant Examiner—Peter F. Kulkosky
Attorney, Agent, or Firm—Luedeka Hodges & Neely

[57] ABSTRACT

Interpenetrating polymer network ion exchange membranes include a microporous polymeric support film interpenetrated by an ion exchange polymer and are produced by absorbing and polymerizing monomers within the support film. The ion exchange polymer provides ion exchange ligands at the surface of and throughout the support film which have sufficient ligand mobility to extract and transport ions across the membrane.

8 Claims, 1 Drawing Sheet

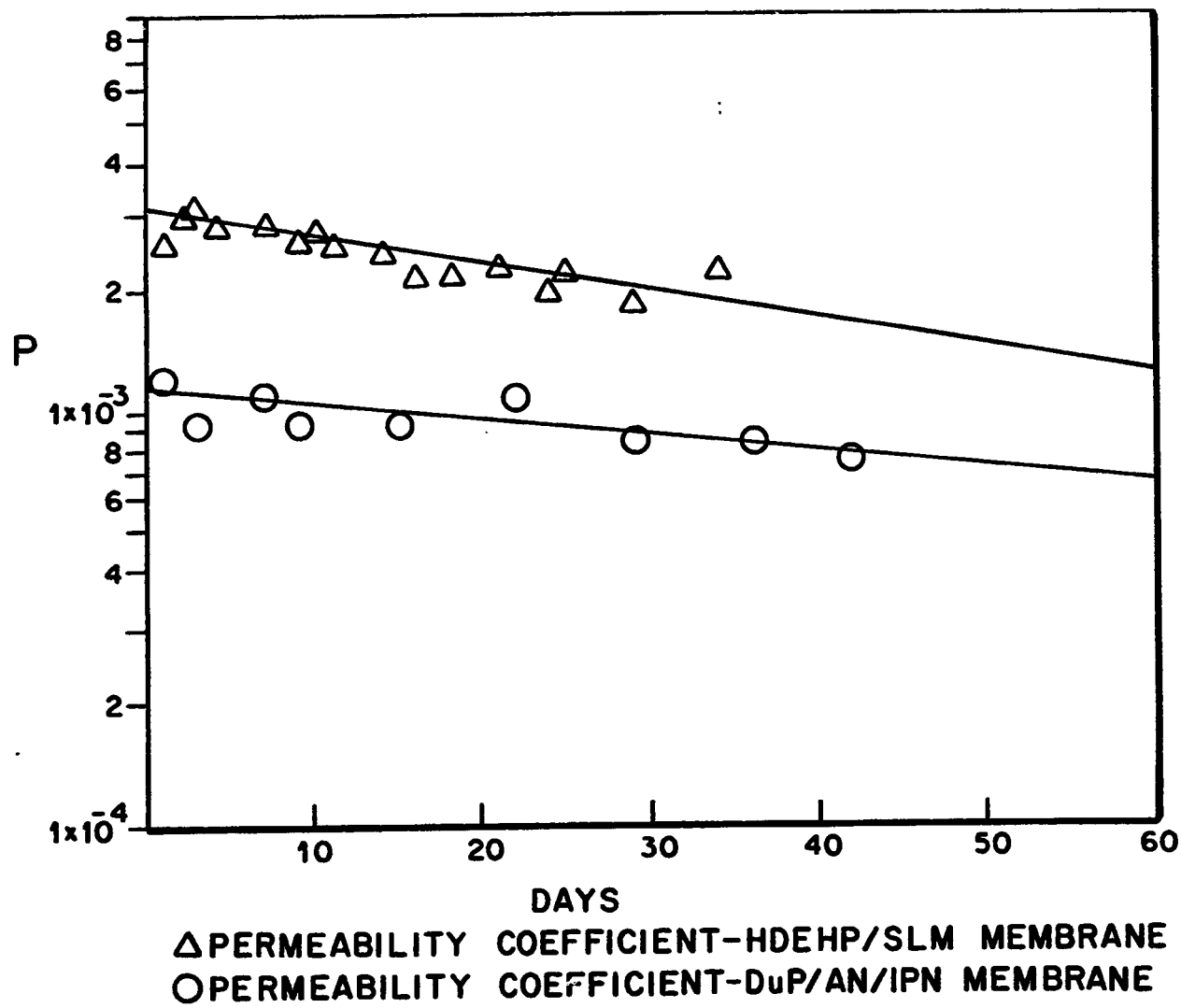

INTERPENETRATING POLYMER NETWORK ION EXCHANGE MEMBRANES AND METHOD FOR PREPARING SAME

The United States Government has rights in this invention pursuant to Department of Energy, Office of Basic Energy Sciences, Contract No. DE-AS05-83ER13113.

The present invention relates to the separation of ions from aqueous solutions by ion exchange and more particularly relates to ion exchange membranes for the extraction of ions from aqueous solutions and transport of extracted ions across the membranes.

The separation of ions from aqueous solutions is often required for pollution control or to recover valuable metals. Various systems have been developed for such purposes based on the extraction of ions with polymeric extractants or liquid extractants. While some success has been achieved towards the development of effective polymeric extractants which can be directly contacted with the aqueous phase, utility is limited due to low ion loading, the lack of selectivity, or the inability to create a continuous process. Liquid-liquid extractant systems where an organic phase containing an extractant is contacted with the aqueous solution to perform the extraction are quite versatile and are generally effective. However, equipment and operation costs are high and further, extractant loss into the aqueous phase occurs due to solubility or entrainment during phase separation. When the extraction is being performed for pollution control purposes, the beneficial effects of the extraction may be counteracted by the solubility or entrainment of the extractant into the aqueous phase.

To attempt to overcome these problems, supported liquid membranes (SLM) have been developed. A SLM is typically used for the extraction of metal ions and consists of a solution of an organic solvent containing the extractant which is absorbed on a polymeric film. An SLM is interposed between two aqueous solutions, a feed solution containing the ions to be extracted and a strip solution for recovering the extracted ions. By adjusting the pH or other concentration gradient between the feed solution and the strip solution, a driving force is provided and ions extracted from the feed solution are transported across the membrane to be transferred into the strip solution. While selective extraction and effective transport can be accomplished using SLM's, SLM's by their very nature have a limited lifetime since the extractant in the organic solution of the membrane is continuously lost into the aqueous phase. The problems with loss of the extractant into the aqueous phase have hampered the application of SLM's to industrial processes.

It is accordingly an object of the present invention to provide ion exchange membranes with enhanced lifetimes for the selective extraction and transport of ions across the membrane.

It is a further object to the present invention to provide a method for preparing a wide variety of such membranes.

These and other objects and advantages of the invention will become more fully apparent as the following detailed description is read in conjunction with the drawing which is a graph depicting results of transport of $Eu^{3+}$ showing a log plot of permeability coefficients over a 60-day period for a membrane according to the present invention compared to results observed for an SLM.

Generally, a membrane according to the present invention comprises a microporous polymeric support film with an ion exchange polymer interpenetrating the support film to form an interpenetrating polymer network membrane. The ion exchange polymer provides ion exchange ligands which are supported by the extraction polymer such that they have sufficient ligand mobility so that extracted metal ions are transported across the membrane. The method for producing the membranes in accordance with the invention generally comprises absorbing suitable polymerizable monomers in a preformed microporous polymer support film. The monomers provide ion exchange ligands and are capable of polymerizing to form an ion exchange polymer interpenetrating the support film with sufficient ligand mobility that extracted metal ions are transported across the membrane.

The membranes are used similarly to and are as versatile and selective as supported liquid membranes but provide substantial increases in membrane lifetime.

The membranes according to the present invention comprise a microporous support film of a hydrophobic polymer having a thickness such that transport of ions across the membrane is accomplished while also providing mechanical strength to the membrane for use in separating a feed solution on one side of the membrane and a strip solution on the other. Since transport is facilitated when membranes of the invention employ thin polymeric support films, the polymer of the film is preferably mechanically strong to provide a thin yet stable film. Preferred support films are polypropylene and polysulfone films with a thickness ranging from about 25 to about 50 $\mu m$ and pore sizes ranging from about 0.02 to about 1 $\mu m$. Support films can be in the form of flat sheets or preferably, hollow fibers, which provide a high ratio of membrane surface area to volume of aqueous solution. Suitable polypropylene films are commercially available in flat sheet or hollow fiber form such as the film sold under the trademark CELGARD by the Celanese Corporation or ACCUREL TM by American Enka, Inc. Other hydrophobic polymer films with similar properties can be employed.

Membranes of the invention have an ion exchange polymer formed within and throughout the support film and thus the composition of the membrane may be referred to as an interpenetrating polymer network (IPN). It is necessary for chains of the ion exchange polymer to be sufficiently long that the ion exchange polymer is entangled within the support film so as to be resistant to leaching out of the membrane when in use. It is desirable for the ion exchange polymer to be distributed generally evenly throughout the polymer support film.

The ion exchange polymer provides within and at the surface of the membrane ion exchange ligands capable of extracting ions by ion exchange. Accordingly, ligand is intended to refer to a functional group capable of ion exchange and includes ligands for both anion and cation exchange. Accordingly, ligands which have been employed on small molecules for liquid-liquid extractions and in SLM's as well as ligands utilized on polymeric ion exchange resins can be employed in the membranes of the invention. Cation exchange ligands include, e.g., sulfonic, carboxylic, phosphinic, phosphonic, phosphoric, hydroxylic, and thiophosphoryl groups. Anion exchange ligand include tertiary and quaternary ammonium and phosphonium groups. However, ion exchange polymers having moieties which are very hydrophilic generally cannot be used since "pore wetting", the displacement of organic diluent from the pores of the support polymer with water, can occur which impedes or entirely prevents selectivity.

It is necessary for the ligands to be supported by the ion exchange polymer such that there is sufficient ligand mobility that ion exchange and transport across the membrane occurs. Ligand mobility refers to the flexibility of the ion exchange ligand adjacent to the polymer. Sufficient ligand mobility is achievable in a membrane in accordance with the present invention by providing an ion exchange polymer which includes a main polymer backbone with spacer groups branching off from the polymer backbone for support of the ligands spaced from the backbone. For example, a suitable ion exchange polymer is produced by free radical polymerization of ethylene-based monomers with the ion exchange ligand bonded to a carbon at least one carbon spaced from the double bond. Suitable monomers of the type includes diundecenyl phosphate (DUP) and allyl 2-ethylhexyl phosphate (AEHP). To achieve sufficient ligand mobility, it is also possible to employ monomers of any type which have been oligomerized so that an oligomeric species having sufficient ligand mobility for ion transport results. For example, any vinyl alkyl phosphonate or any styrenic can be oligomerized within the support network giving species of sufficient mobility for transport to occur.

Membranes according to the invention are produced by absorbing polymerizable monomers in a suitable solvent, e.g., toluene or other inert organic solvent, into the support film and polymerizing to produce the ion exchange polymer within the support film. It is necessary for the polymerization to provide a sufficiently long chain length to inhibit leaching of the resulting ion exchange polymer from the support. A minimum or "critical entanglement concentration" (CEC) of the monomers must be provided within the support film to yield an interpenetrating polymer network upon polymerization. On the other hand, however, polymerization must be limited so that the pores of the membranes are not physically blocked to the extent that transport of ions cannot occur and it is necessary to limit polymerization so that ion exchange groups are not so close together in the membrane that "pore wetting" occurs when the membrane is in use.

Polymerization of monomers within the support film can occur by step growth or chain growth depending on the monomers employed and can be controlled by known procedures for controlling polymer chain length. Control over the polymerization can be achieved by adjusting the concentration of monomers and initiator in the solvent, by employing chain terminators or chain transfer agents, or other such procedures. It is particularly advantageous to copolymerize two monomers to produce the ion exchange polymer whereby the relative concentration of the two monomers is adjusted to determine chain length. For example, the more reactive acrylonitrile can be copolymerized with ethylene-based monomers generally or, more specifically, allylic-type monomers in a free radical polymerization to increase chain length.

Membranes according to the invention are used similarly to support liquid membranes. Before use, the membranes are swelled with an organic diluent, typically a hydrocarbon such as dodecane, toluene, diethylbenzene, and triethylbenzene. However, since aromatic diluents slowly chemically attack polypropylene supports, aliphatic diluents are generally preferable.

As with SLM's, a feed solution containing the ions to be extracted is placed in contact, preferably with either flow or agitation, with one side of the membrane. The other side of the membrane is contacted with a strip solution, preferably flowing or agitated, which contains ions which establish a concentration gradient between the strip and feed solution which act to drive the transport of ions across the membrane. To achieve a high concentration of the extracted ions in the strip solution, a volume of strip solution much lower than the volume of feed solution is employed. To maintain the driving force of the transport, the concentration of chemicals is continuously adjusted. The membranes of the invention are most advantageously employed as hollow-fibers incorporated into multifiber bundle.

The interpenetrating polymer network membranes according to the invention have generally equivalent permeability coefficients compared to supported liquid membranes but substantially longer usable lifetimes.

Using the method of the invention for the producing membranes of the invention, a wide variety of IPN membranes can be produced using preformed and commercially available polymer films. Procedures for producing the membranes are uncomplicated and do not require expensive equipment.

The following examples are offered to illustrate the invention and are not intended to be limiting. Example I relates to the membranes of the invention employing polypropylene support films within which diundecenyl phosphate (DUP) is polymerized. Example II relates to membranes employing polypropylene support films within which a copolymer of DUP and acrylonitrile (AN) is polymerized.

EXAMPLE I

Preparation of Diundecenyl Phosphate (DUP)

A solution of 4.293 g of $POCl_3$ (0.28 mol) and 110.7 g of pyridine (1.4 mol) in 1 L of anhydrous diethyl ether is poured into a flame-dried 2-L round-bottom flask equipped with thermometer, overhead stirrer, and addition funnel containing 250 mL of a 2.35 M 10-undecen-1-ol ether solution. (10-undecen-1-ol can be obtained from Aldrich Chemical Corporation.) The alcohol is added over a period of 5 hours in order to maintain a temperature of 25°–30° C. Stirring is continued for 16 hours.

The ether phase is washed with 160 mL of 2 N NaOH in saturated $NaNO_3$ and then with saturated $NaNO_3$ solution until the washings are neutral. After the DUP is converted to its sodium salt form, 400 mL of 1 N $CuSO_4$ is added and the mixture shaken vigorously for 5 minutes. After the phases are separated, most of the ether is removed by evaporation under vacuum and the viscous liquid is added to 2 L of acetone. When the acetone solution is cooled with an ice water bath, a blue precipitate forms ($Cu(DUP)_2$), which is collected, washed with cold acetone, and air-dried at 25° C. for 24 hours.

The $Cu(DUP)_2$ is dissolved in 200 mL of ether and washed four times with 100 mL of 4 N HCL. The ether is removed and the white solid is dissolved in 200 mL of anhydrous ether, which is again removed. The process is repeated until the DUP is free of any HCl odor. Pure DUP (mp 33.0°–34.8° C.) can thus be obtained in 75% yield based on POCl₃.

Preparation Of DUP/IPN Membranes

8cm×4cm strips of polypropylene film (CELGARD, Celanese Corporation, New York, N.Y.) are placed on a glass plate and the toluene solutions containing DUP concentrations of either 1.0 M or 0.1 M as shown in Table 1 are applied to the polypropylene film. Before application to the polypropylene film, 2%(w/v) azobisisobutyronitrile (AIBN) is added to the monomer solution. Sufficient monomer solution is applied to the film so that the film turns from white opaque to generally clear. Another glass plate is applied to cover and sandwich the polypropylene film between the two glass plates, and the plates are sealed to block exposure to air. The polypropylene film is allowed to swell overnight (approximately 17 hours) though much shorter times (e.g., 1 hour) will suffice. The swelled film is exposed to the air and the toluene is allowed to evaporate for approximately five minutes. Dodecane is applied to the membrane by the same procedures as the monomer solution and is allowed to swell between the glass plates for approximately five minutes. The membrane is removed from the plates and is contacted with filter paper to remove dodecane which is not absorbed by the membrane.

Preparation Of DUP/SLM Membranes

Supported liquid membranes (DUP extractant) are produced using the concentrations of DUP in toluene of either 1.0 M or 0.1 M as shown in Table 1 by the same procedures used in the production of IPN membranes except that the AIBN initiator is not added to the toluene solution.

Membrane Elution Study

The DUP/IPN and DUP/SLM membranes are suctionfiltered to remove excess toluene solution rinsed with 25% ethanol and placed in glass-frit funnels. A sample is taken for % P analysis prior to any elution in order to determine an initial capacity. Phosphorous analysis is performed by digesting a weighed amount (40–60 mg) of oven-dried membrane by heating with 5 mL of HNO₃/5mL of 72% HClO₄ to a clear and colorless solution. After the mixture is cooled and diluted to 100 mL with water, a 10-mL aliquot is added to 3.5 mL of 72% HClO₄, 3.5 mL of ammonium molybdate solution (4.14 g in 50 mL of H₂O), and 4.5 mL of fresh amidol reagent (1 6 of recrystalized amidol (Aldrich, 2.7 mL of H₂SO₄, and 10 g of Na₂SO₃ in 90 mL of H₂O). The solution is then further diluted to 50 mL and allowed to develop for 30 minutes. The absorbance is measured at 700 nm on a Bausch and Lomb Spectronic 21 and the % P calculated from a Beer's law plot with a series of KH₂PO₄ standards.

The membranes are eluted with a 500 mL 50% ethanol solution with a sample taken at the end of 12 hours. A second elution is similarly performed with 50% ethanol for 12 hours and another sample is taken. Table 1 shows the results.

TABLE 1

| | DUP Membranes | | | |
|---|---|---|---|---|
| Type | [DUP] | [P] | [P] 1st Elution | [P] 2nd Elution |
| IPN | 1 M | 2.06 meq/g | .80 meq/g | .47 meq/g |

TABLE 1-continued

| | DUP Membranes | | | |
|---|---|---|---|---|
| Type | [DUP] | [P] | [P] 1st Elution | [P] 2nd Elution |
| SLM | 1 M | 2.07 meq/g | .14 meq/g | .13 meq/g |
| IPN | .1 M | 0.46 meq/g | .05 meq/g | .05 meq/g |
| SLM | .1 M | 0.40 meq/g | .04 meq/g | .08 meq/g |

EXAMPLE II

DUP/AN/IPN Membranes

Two IPN membranes are prepared according to the IPN membrane preparation procedures of Example I using toluene solutions containing 0.25 M DUP and 1.5 M acrilonitrile (AN) and 0.1 M DUP and 1.8 M AN, respectively.

HDEHP/SLM Membrane

An SLM membrane was prepared using 0.1 M di(2-ethylhexyl) phosphoric acid according to the SLM membrane preparation procedures of Example I.

Transport Procedures

Following the evaporation of toluene from the DUP/AN/IPN and HDEHP/SLM membranes, dodecane is applied to the membranes and the membranes are allowed to swell for approximately five minutes.

Each of the dodecane swelled membranes are employed in apparatus to divide feed and strip solutions held in compartments provided by two plexiglas blocks which provide an open-topped compartment with similar side openings at which the membrane separates the compartments. Two planar teflon gaskets having an opening conforming to the opening in the blocks are placed on either side of the membrane and the blocks, gaskets, and membrane are clamped together with the membrane dividing the two compartments. The exposed membrane area is 2.56 cm². Overhead stirrers are provided in each compartment mentioned and the apparatus is immersed in a 30° C. waterbath.

For each of the membranes, 80 ml of feed solution containing tracer level 152–154 Eu(NO₃)₃, 10⁻²M HCL and 1.0 M NaCl is placed in the feed compartment and 1 M HCl is placed in the strip compartment. The Eu³⁺ concentration in the feed solution is monitored by removing 0.050ml aliquots and determining concentration with a Beckman BIOGAMMA™ gamma counter. Eu³⁺ concentration is measured on a daily basis over two months as shown in the drawing. The permeability coefficient is derived by the equation $$\ln \frac{C}{C_0} = -\frac{Q}{V} Pt$$

wherein $C_0$ is the initial concentration of Eu³⁺, $C_t$ is the concentration at time t and A and V are the membrane area and volume of the feed solution, respectively. The slope of the plot of ln $C_0/C_t$ against time is employed to calculate P, the permeability coefficient for the membrane. Solutions are changed at the time of each calculation. The process of calculating the permeability coefficient is repeated for the DUP/AN/IPN membranes and the HDEHP/SLM membrane over a period of 60 days at the daily intervals shown in the drawing.

The 0.1 M DUP/1.8 M AN membrane fails to transport, probably due to clogging of the membrane pores by too much polymerization. The permeability coefficient results of the 0.25 DUP and 1.5 AN IPN membrane and the HDEHP membrane are shown in the drawing where the permeability is plotted on a log scale against time. The slope calculated from the permeability coefficient data for the HDEHP/SLM membrane is −0.031 and the slope for the DUP/AN/IPN membrane is −0.007.

What is claimed is:

1. An ion exchange membrane for the extraction of ions from aqueous solutions and transport of the ions across the membrane comprising a microporous polymeric support film interpenetrated by an ion exchange polymer to form an interpenetrating polymer being formed from a monomer selected from the class consisting of diundecenyl phosphate and allyl 2-ethylexyl phosphate and comonomers thereof, wherein said polymer includes network, said ion exchange polymer including a main polymer backbone, ion exchange ligands for transporting the ion across the membrane, and ligand support groups branching laterally from said backbone at spaced apart locations along said backbone, said ion exchange ligands being supported on said support groups at positions laterally spaced from said backbone by a sufficient distance such that there is sufficient ligand mobility to provide for transport of the ions between adjacent ligands by flexure of said support groups relative to said backbone, whereby the spacing between said ligand support groups along said main polymer backbone is selected to control the transport of water through the membrane.

2. The membrane of claim 1 wherein said polymeric support film is fabricated from a hydrophobic polymer selected from the class consisting of polypropylene and polysulfone.

3. The membrane of claim 2 wherein said polymeric support films have a thickness between about 25 to about 50 μm and between about 0.02 and about 1 μm.

4. The membrane of claim 1 wherein the polymeric support film is in the form of a hollow fiber.

5. A method for producing an ion exchange membrane for the extraction of ions from aqueous solutions and transporting ions across the membrane comprising absorbing polymerizable monomers in a suitable solvent into a selected from the group consisting of diundecenyl phosphate and allyl 2-ethylhexyl phosphate and comonomers thereof and being preformed microporous polymeric support film, the monomer being selected from the group consisting of diundecyl phosphate and allyl 2-ethylhexyl phosphate and comonomers thereof and being polymerizable to provide an ion exchange polymer including a main polymer backbone, ion exchange ligands for transporting the ions across the membrane, and ligand support groups branching laterally from the backbone at spaced apart locations along the backbone, the ion exchange ligands being supported on the support groups at positions laterally spaced from the backbone by a sufficient distance such that there is sufficient ligand mobility to provide for transport of the ions between adjacent ligands by flexure of the support groups relative to the backbone, and causing said monomers to polymerize to form the ion exchange polymer interpenetrating said support film.

6. The method of claim 5 wherein said preformed polymeric support film is fabricated from a hydrophobic polymer selected from the class consisting of polypropylene and polysulfone.

7. The method of claim 6 wherein said preformed polymeric support film has a thickness of between about 25 to about 50 μm and pore sizes between about 0.02 and about 1 μm.

8. The method of claim 5 wherein said preformed support film is in the form of a hollow fiber.

* * * * *